United States Patent [19]

Földhazy

[11] Patent Number: 4,654,023
[45] Date of Patent: Mar. 31, 1987

[54] MECHANICAL SEAL FOR CASING OF CENTRIFUGAL SEPARATORS

[75] Inventor: Zoltan Földhazy, Tumba, Sweden

[73] Assignee: Alfa-Laval Separation AB, Tumba, Sweden

[21] Appl. No.: 799,588

[22] Filed: Nov. 19, 1985

[30] Foreign Application Priority Data

Nov. 28, 1984 [SE] Sweden .................. 8405997

[51] Int. Cl.$^4$ .............................. B04B 9/00
[52] U.S. Cl. ........................ 494/41; 277/30; 277/93 SD; 277/97; 494/15; 494/83
[58] Field of Search .............. 494/83, 38, 41, 82, 494/84, 85, 13, 15; 277/97, 30, 93, 98

[56] References Cited

U.S. PATENT DOCUMENTS

| | | | |
|---|---|---|---|
| 1,968,788 | 7/1934 | Tomlinson | 494/38 |
| 2,985,473 | 5/1961 | Parker | 277/97 |
| 3,126,338 | 3/1964 | Steinacker | 494/41 |
| 3,970,243 | 7/1976 | Hentschel | 494/83 |
| 4,406,462 | 9/1983 | Witten | 277/93 SD |

FOREIGN PATENT DOCUMENTS 1425025 12/1968 Fed. Rep. of Germany .
439820 1/1985 Sweden .

Primary Examiner—Robert W. Jenkins
Attorney, Agent, or Firm—Cyrus S. Hapgood

[57] ABSTRACT

The present invention relates to a centrifugal separator of the kind comprising a rotor (1), which is supported by a vertical driving shaft (2), a stationary casing (3), which surrounds the rotor (1) and has a bottom opening (5) through which the driving shaft (2) extends, a frame (4) which supports the casing (3) and is arranged to support radially in a resilient manner a radial bearing (6) for the driving shaft (2), and a mechanical seal with two sealing rings abutting axially against each other, one rotatable (11) and one non-rotatable (13), to seal the interior of the casing (3) from connection with the space surrounding the radial bearing (6) via the opening (5) in the bottom of the casing (3). In order to decrease the stresses on the radial bearing (6) and to provide for a more reliable sealing between the casing (3) and the housing of the mechanical seal, the non-rotatable sealing ring (13) is radially fixed relative to the casing (3), whereas the rotatable sealing ring (11) is arranged during operation to be moving radially relative to the non-rotatable sealing ring (13).

6 Claims, 1 Drawing Figure

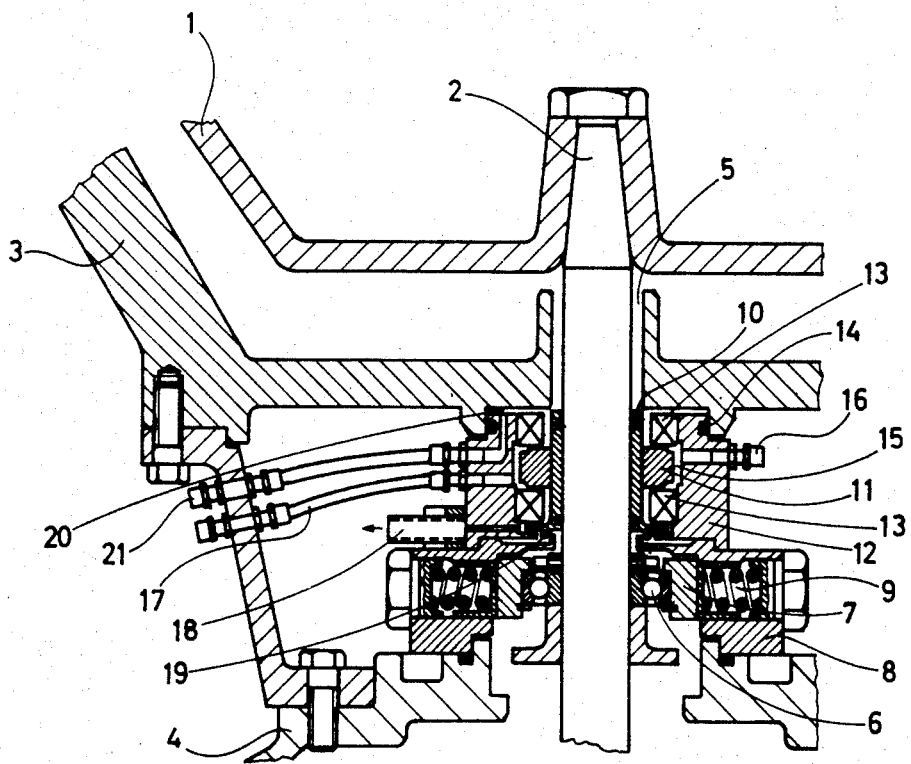

MECHANICAL SEAL FOR CASING OF CENTRIFUGAL SEPARATORS

The present invention relates to centrifugal separators of the kind comprising a rotor, which is supported by a vertical driving shaft, a stationary casing, which surrounds the rotor and has a bottom opening through which the driving shaft extends, a frame which supports the casing and is arranged to support radially in a resilient manner a radial bearing for the driving shaft, and a mechanical seal with at least two sealing rings abutting axially against each other, one rotatable and one non-rotatable, to seal the interior of the casing from communication with the space surrounding the radial bearing via the bottom opening of the casing.

Centrifugal separators of this kind are used when there is a need for aseptic cleaning of the interior of the casing or in connection with centrifugation of biochemical products. In such cases the interior of the casing has to be sealed from the surrounding atmosphere as efficiently as possible to avoid the risk of getting a separated product polluted by bacteria from the outside, or having bacteria from a product containing bacteria passing out of the casing and polluting the surrounding of the casing.

In a previously known centrifugal separator of this kind the sealing between the casing and the shaft has been arranged by means of a mechanical seal which comprises a rotatable sealing ring supported by the shaft, and one or two non-rotatable sealing rings. The non-rotatable sealing rings are supported by a surrounding sealing housing, which in turn is supported by a bearing housing. Further, the sealing housing is arranged resiliently in the radial direction relative to the frame. Owing to the fact that the sealing housing is supported by the bearing housing it will follow all the radial movements of the shaft and, thus, move relative to the casing which surrounds the centrifuge rotor. Therefore, a sealing means, a so called secondary sealing means, has to be arranged between the sealing housing and the casing, and be made as flexible as to permit the described relative movement without losing its sealing effect. For this reason a so called bellows seal is used in the known centrifugal separator.

However, this sealing arrangement suffers from certain defects. Due to unbalances and other oscillation generating phenomena in the rotating system of the centrifugal separator the driving shaft will perform rapid radial movements, which via the bearing housing are transmitted to the sealing housing and the non-rotatable sealing rings arranged therein. The mass forces from the sealing housing and the non-rotatable sealing rings are thereby loading the bearing both with heavy radial forces and with a moment. The stresses on the bearing obtained hereby are limiting for the speed of rotation at which separation can take place and, consequently, for the separation result. Furthermore, the said secondary sealing means is subjected to heavy vibrations, which means that its life time is shortened by fatigue.

The object of the present invention is to eliminate the above mentioned defects of hitherto known centrifugal separators of the kind specified initially, and to provide a sealing arrangement which does not result in unwanted limitations for the separation result. This is achieved according to the invention by having the non-rotatable sealing ring of the mechanical seal radially fixed relative to the casing, whereas the rotatable sealing ring is arranged in operation to be moving radially relative to the non-rotatable sealing ring. The non-rotatable sealing rings and parts connected therewith, such as a sealing housing, hereby will not follow the radial movements of the driving shaft and, thus, will not be loading the bearing. Besides, the secondary sealing means will not be influenced by any relative movements between the sealing housing and the casing. Due to the invention the sealing housing may be tightly connected with the casing even wthout such a secondary sealing means.

In the following the invention is more closely described with reference to the accompanying drawing. In this a section is shown through a part of a centrifugal separator according to the invention.

A centrifugal separator according to the invention has a rotor 1, which is supported and driven by a vertical driving shaft 2. The rotor is surrounded by a casing 3, which is supported by a frame 4 and has a bottom opening 5. The driving shaft 2 is extending from the interior of the frame, in which driving means and bottom bearings (not shown) are arranged, through said bottom opening 5 into the interior of the casing 3. At its upper end the driving shaft 2 is journalled in a radial bearing 6, the bearing housing 7 of which is radially supported in a resilient manner by the frame via a spring device. This spring device comprises a spring casing 8 fixed at the frame, in which casing a number of resilient elements 9 are distributed around the circumference of the bearing housing 7, and arranged to support the bearing housing 7 radially. This arrangement permits but counteracts radial movements of the bearing 6 and the driving shaft 2.

The interior of the casing 3 is sealed from communication with the space around the radial bearing 6 by means of a mechanical seal, the rotatable parts of which, a hub 10 and a sealing ring 11 fixed on the hub, are firmly connected with the driving shaft, and the non-rotatable parts of which, a sealing housing 12 and non-rotatable sealing rings 13 provided therein (only schematically shown), are radially fixed relative to the casing 3. In the shown embodiment the mechanical seal comprises two non-rotatable sealing rings 13 arranged within the sealing housing 12 axially on each side of the rotatable sealing ring 11. Naturally, the invention is not restricted to this embodiment but is also including other mechanical seals, for instance seals having only one rotatable and one non-rotatable sealing ring, or seals having more than one rotatable sealing ring.

In the shown embodiment the rotatable sealing ring 11 has two sealing surfaces, which are facing axially away from each other and which are abutting against sealing surfaces on respective non-rotatable sealing rings 13. Each of the two non-rotatable sealing rings 13 is axially movable and is pressed into sealing abutment against the rotatable sealing ring 11 by means of springs (not shown). Hereby, axial relative movements between the rotatable sealing ring 11 and the non-rotatable sealing housing 12 can be permitted. The non-rotatable sealing rings 13 are radially fixed relative to the sealing housing 12, which in turn is firmly connected with the casing 3. Even though it is possible to tightly connect the sealing housing 12 with the casing 3 without a special sealing means, a so called O-ring gasket 14 is used in the shown embodiment.

In the shown embodiment the sealing housing 12 also is firmly connected with the spring housing 8, whereby the non-rotatable parts of the mechanical seal form a part of a sleeve shaped body, which surrounds the driving shaft of the rotor and connects the casing 3 with the frame 4.

The sealing housing 12 and both of the non-rotatable sealing rings 13 define together with the rotatable sealing ring 11 a chamber 15, which surrounds the rotatable sealing ring 11. This chamber 15 is arranged to be flown through by a sealing liquid that is supplied through a supply conduit 16 and is discharged through an outlet conduit 17. The sealing liquid is flowing in contact with the sealing surfaces of the sealing rings, whereby the cooling and wetting of these are ensured. Preferably, the pressure of the sealing liquid in the chamber 15 is kept higher than the pressure on the other side of the sealing surfaces. The sealing liquid hereby also functions as a blocking liquid. Sealing liquid that passes between the sealing rings is drained off through a drainage channel 18 arranged in the sealing housing 12. In the shown embodiment this channel 18 is located between the lower non-rotatable sealing ring 13 and the spring housing 8 and is separated from the radial bearing 6 by means of a labyrinth seal 19.

At its upper part the sealing housing is provided with a passage 20, which is connected to a circulation conduit 21 for cleaning liquid. Circulation of cleaning liquid this way is intended to take place upon cleaning of parts of the mechanical seal, the driving shaft 2, and the casing 3 in the area of the bottom opening 5.

By designing a centrifugal separator in the described manner, according to which the non-rotatable parts of a mechanical seal are radially fixed in relation to the casing and is supported by members firmly connected to the frame, it is obtained that said non-rotatable parts are not loading the radial bearing, i.e. they are not following the radial movements of the radial bearing. This means that the speed at which the centrifuge rotor can be rotated may be increased with a consequently better separation result. Besides, it will be easier to establish an endurable sealing between the sealing housing and the casing.

I claim:

1. In combination with a centrifugal separator having a rotor (1), a vertical driving shaft (2) supporting the rotor for rotation on an axis, a stationary casing (3) surrounding the rotor and having a bottom opening (5) through which the driving shaft extends, a frame (4) supporting the casing, and a radial bearing (6) for the driving shaft supported radially in a resilient manner by said frame, a mechanical seal comprising two sealing rings abutting axially against each other to seal the interior of said casing from communication through said bottom opening with the space surrounding said radial bearing, one of said rings (11) being rotatable and the other ring (13) being non-rotatable, and means (12) fixing said non-rotatable sealing ring (13) against radial movement relative to the casing (3) while allowing the rotatable sealing ring (11) to move radially relative to the non-rotatable ring (13) during rotation of the rotor, said non-rotatable sealing ring (13) being tightly connected to the casing (3) to separate the interior of the casing from the region surrounding the mechanical seal.

2. The combination of claim 1, comprising also a second non-rotatable sealing ring (13) engaging the rotatable sealing ring (11) at a side thereof axially remote from the other non-rotatable sealing ring.

3. The combination of claim 2, in which said fixing means (12) include a non-rotatable sealing housing surrounding the driving shaft (2) and containing said sealing rings (11, 13).

4. The combination of claim 1, in which said fixing means (12) include a non-rotatable sealing housing surrounding the driving shaft (2) and containing said sealing rings (11, 13), said non-rotatable ring (13) and housing (12) forming part of a sleeve-shaped body surrounding said driving shaft (2) and connecting the casing (3) to said frame (4).

5. The combination of claim 4, in which said sealing rings (11, 13) and sealing housing (12) define a chamber (15) for through flow of a sealing liquid in contact with the sealing surface of said rings, the combination comprising also means (16) for supplying sealing liquid to said chamber (15).

6. The combination of claim 5, in which said sealing housing (12) has a channel (18) for draining sealing liquid which has passed between the sealing rings (11, 13).

* * * * *